US012307941B1

(12) United States Patent
Chang et al.

(10) Patent No.: US 12,307,941 B1
(45) Date of Patent: May 20, 2025

(54) DISPLAY DEVICE AND CONTROL METHOD THEREOF

(71) Applicant: HIMAX TECHNOLOGIES LIMITED, Tainan (TW)

(72) Inventors: Yaw-Guang Chang, Tainan (TW); Pei Yao Chang, Tainan (TW); Jhou-Pu Yang, Tainan (TW); Chun-Yu Chiu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/644,102

(22) Filed: Apr. 24, 2024

(51) Int. Cl.
*G09G 3/32* (2016.01)
*G09G 3/20* (2006.01)

(52) U.S. Cl.
CPC ..... *G09G 3/2092* (2013.01); *G09G 2330/028* (2013.01); *G09G 2330/06* (2013.01)

(58) Field of Classification Search
CPC ........... G09G 3/2092; G09G 2330/028; G09G 2330/06
See application file for complete search history.

(56) References Cited

U.S. PATENT DOCUMENTS 5,831,605 A * 11/1998 Yasui .................. G09G 3/3655 345/204
8,514,162 B2 * 8/2013 Moh .................. G09G 3/3696 345/94
8,552,945 B2 * 10/2013 Lim .................. G09G 3/3655 349/149
8,878,881 B2 * 11/2014 Li .................. G09G 3/3696 345/690
9,601,077 B2 * 3/2017 Lim .................. G09G 3/3696
2006/0244704 A1 * 11/2006 JaeHun .................. G09G 3/3655 345/92
2008/0117148 A1 * 5/2008 Tu .................. G09G 3/3655 345/87
2008/0198125 A1 * 8/2008 Park .................. G09G 3/3696 345/98
2008/0266217 A1 * 10/2008 Kim .................. H03K 5/086 327/108
2009/0015528 A1 * 1/2009 Sheu .................. G09G 3/3696 345/87
2009/0135124 A1 * 5/2009 Nakatsuka .................. G09G 3/3655 345/94
2010/0238149 A1 * 9/2010 Kishi .................. G09G 3/3233 345/206
2010/0277399 A1 * 11/2010 Yu .................. G09G 3/3655 345/94
(Continued)

*Primary Examiner* — Jose R Soto Lopez
(74) *Attorney, Agent, or Firm* — JCIPRNET

(57) ABSTRACT

A display device includes a plurality of display area substrates, a common voltage generator and at least one AC voltage generator. The display area substrates are disposed in a display panel, wherein each of the display area substrates receives a gate line signal, a source line signal and a common voltage. The common voltage generator is coupled to the display area substrates for generating the common voltage to each of the display area substrates. The AC voltage generator is coupled to the common voltage generator, for generating an adjusting voltage to the common voltage according to driving current information of a plurality of source drivers of the display device, wherein the adjusting voltage has an AC voltage level.

14 Claims, 7 Drawing Sheets

(56) References Cited

U.S. PATENT DOCUMENTS

| | | | | |
|---|---|---|---|---|
| 2014/0285462 | A1* | 9/2014 | Lee | G06F 3/0416 345/173 |
| 2014/0340381 | A1* | 11/2014 | Kim | G09G 3/3677 345/212 |
| 2015/0049041 | A1* | 2/2015 | Yousefpor | G06F 3/0445 345/174 |
| 2015/0062471 | A1* | 3/2015 | Sung | G02F 1/1362 349/33 |
| 2015/0221271 | A1* | 8/2015 | Hwang | G09G 3/3655 345/212 |
| 2016/0140920 | A1* | 5/2016 | Lee | G09G 3/3614 345/96 |
| 2017/0236485 | A1* | 8/2017 | Lee | G09G 3/3688 345/211 |
| 2019/0073971 | A1* | 3/2019 | Bai | G09G 3/3614 |
| 2019/0383863 | A1* | 12/2019 | Mizusaki | G01R 19/25 |
| 2022/0223087 | A1* | 7/2022 | Huang | G09G 3/20 |
| 2023/0351948 | A1* | 11/2023 | Ma | G09G 3/32 |
| 2024/0027854 | A1* | 1/2024 | Diao | G02F 1/136286 |

* cited by examiner

DISPLAY DEVICE AND CONTROL METHOD THEREOF

BACKGROUND

Technical Field

The disclosure relates to display devices and a control method thereof, particular to the display devices and a control method thereof which can reduce radiations on a display panel caused by gate line signals and source line signals.

Description of Related Art

Please refer to FIG. 1A and FIG. 1B, wherein FIG. 1A illustrates a schematic diagram of a display device of prior art, and FIG. 1B illustrates a waveform plot the display device in FIG. 1A. The display device 100 includes a display panel 110 and a driver integrated circuit (IC) 120. A plurality of display area substrates 111~115 are disposed in the display panel 110. The display area substrates 111 and 114 disposed in a same row commonly receive a same gate line signal G1; the display area substrate 113 receives a gate line signal G2; and the display area substrates 112 and 115 disposed in a same row commonly receive a same gate line signal G3. On the other hand, the display area substrates 111 and 112 disposed in a same column commonly receive a same source line signal SC1; the display area substrate 113 receives a source line signal SC2; and the display area substrates 114 and 115 disposed in a same column commonly receive a source line signal SC3.

The driver IC 120 provides a plurality of common voltage RX to each of the display area substrates 111 to 115. In each of the display area substrates 111 to 115, there are parasitic capacitors between any two ends for receiving the common voltage RX, receiving each of the gate line signals G1 to G3 and receiving each of the source line signals SC1 to SC3. That is, by referring to FIG. 1B, although the driver IC 120 provides a common voltage RX_OP with a DC (direct current) voltage level, the common voltage RX received by each of the display area substrates 111 to 115 may be interfered by transition statuses of gate line signal Gx and source line signal SCx. In here, the gate line signal Gx may be one of the gate line signals G1 to G3, and the source line signal SCx may be one of the source line signals SC1 to SC3. Such as that, a positive pulse may be generated on the common voltage RX caused by a rising status of the gate line signal Gx or the source line signal SCx, and a negative pulse may be generated on the common voltage RX caused by a failing status of the gate line signal Gx or the source line signal SCx. Radiations on the display panel 110 may be occurred by the rising edge and the failing edge, and Electromagnetic Interference (EMI) on the display device 100 can be occurred.

SUMMARY

The disclosure provides a plurality of display devices and a control method thereof for reducing radiations on a display panel caused by gate line signals and source line signals.

The display device includes a plurality of display area substrates, a common voltage generator and at least one AC voltage generator. The display area substrates are disposed in a display panel, wherein each of the display area substrates receives a gate line signal, a source line signal and a common voltage. The common voltage generator is coupled to the display area substrates for generating the common voltage to each of the display area substrates. The AC voltage generator is coupled to the common voltage generator, for generating an adjusting voltage to the common voltage according to driving current information of a plurality of source drivers of the display device, wherein the adjusting voltage has an AC voltage level.

The display device includes a plurality of display area substrates, a common voltage generator and at least one AC voltage generator. The display area substrates are disposed in a display panel, wherein each of the display area substrates receives a gate line signal, a source line signal and a common voltage. A common voltage generator is coupled to the display area substrates for generating the common voltage to each of the display area substrates. The AC voltage generator is coupled to the common voltage generator, for generating an adjusting voltage to the common voltage according to a transition status of corresponding gate line signal, wherein the adjusting voltage has an AC voltage level.

The control method of a display device includes: disposing a plurality of display area substrates in a display panel, wherein each of the display area substrates receives a gate line signal, a source line signal and a common voltage; providing a common voltage generator for generating the common voltage to each of the display area substrates; and, providing at least one AC voltage generator for generating an adjusting voltage to the common voltage according to driving current information of a plurality of source drivers of the display device or according to a transition status of corresponding gate line signal by the AC voltage generator, wherein the adjusting voltage has an AC voltage level.

Based on the above, the display device of present disclosure provides the AC voltage generator to generate the adjusting voltage according to driving current information of a plurality of source drivers, and compensate the common voltage by applying the adjusting voltage to the common voltage. Such as that, radiation on a display area of the display device caused by the source lines signals and the gate line signals can be reduced, and EMI on the display device can be reduced correspondingly.

DETAILED DESCRIPTION OF DISCLOSED EMBODIMENTS

Figure 1A:
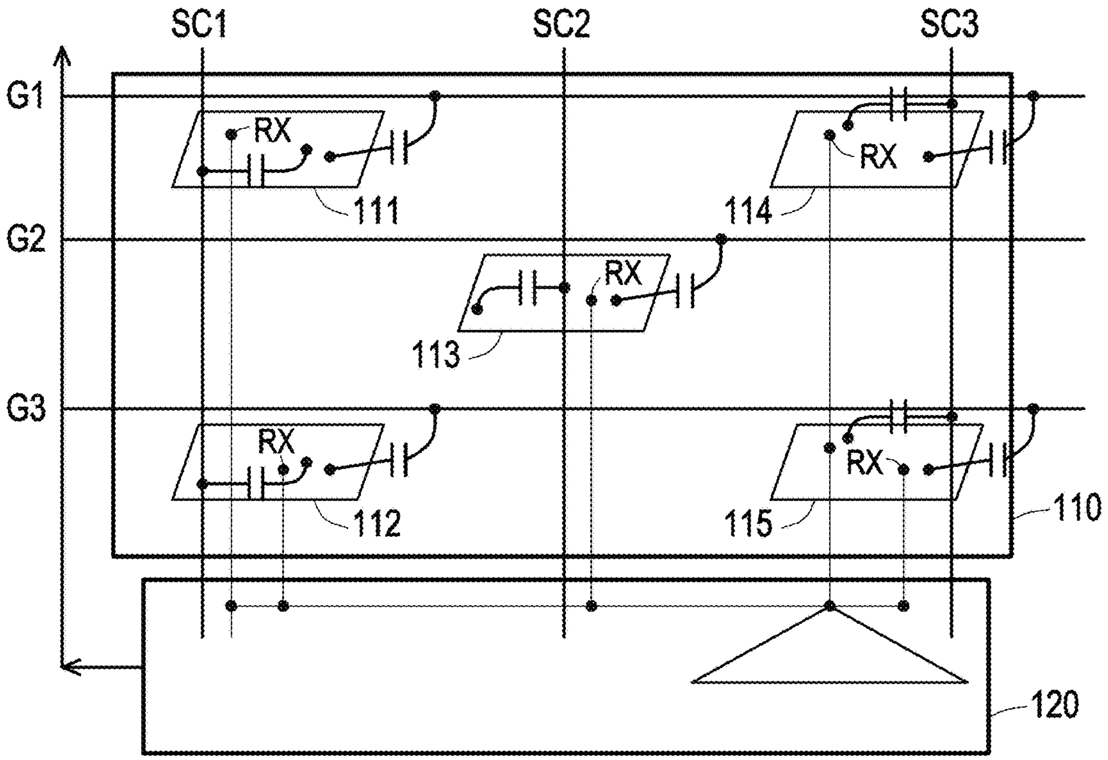
FIG. 1A (PRIOR ART)
FIG. 1A illustrates a schematic diagram of a display device of prior art.
Figure 1B:
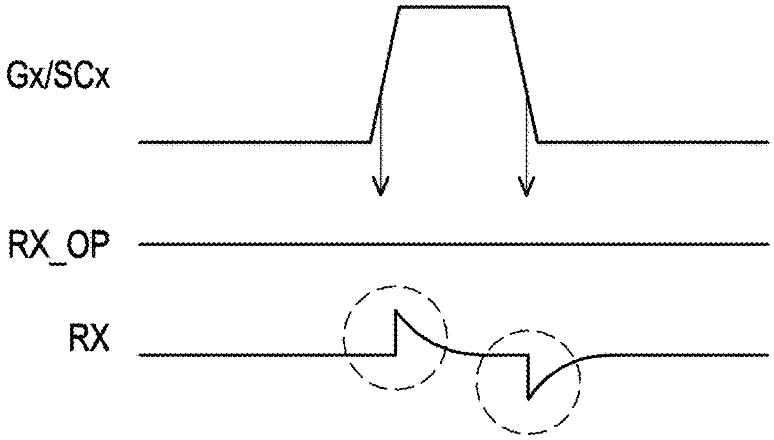
FIG. 1B (PRIOR ART)
FIG. 1B illustrates a waveform plot the display device in FIG. 1A.
Figure 2A:
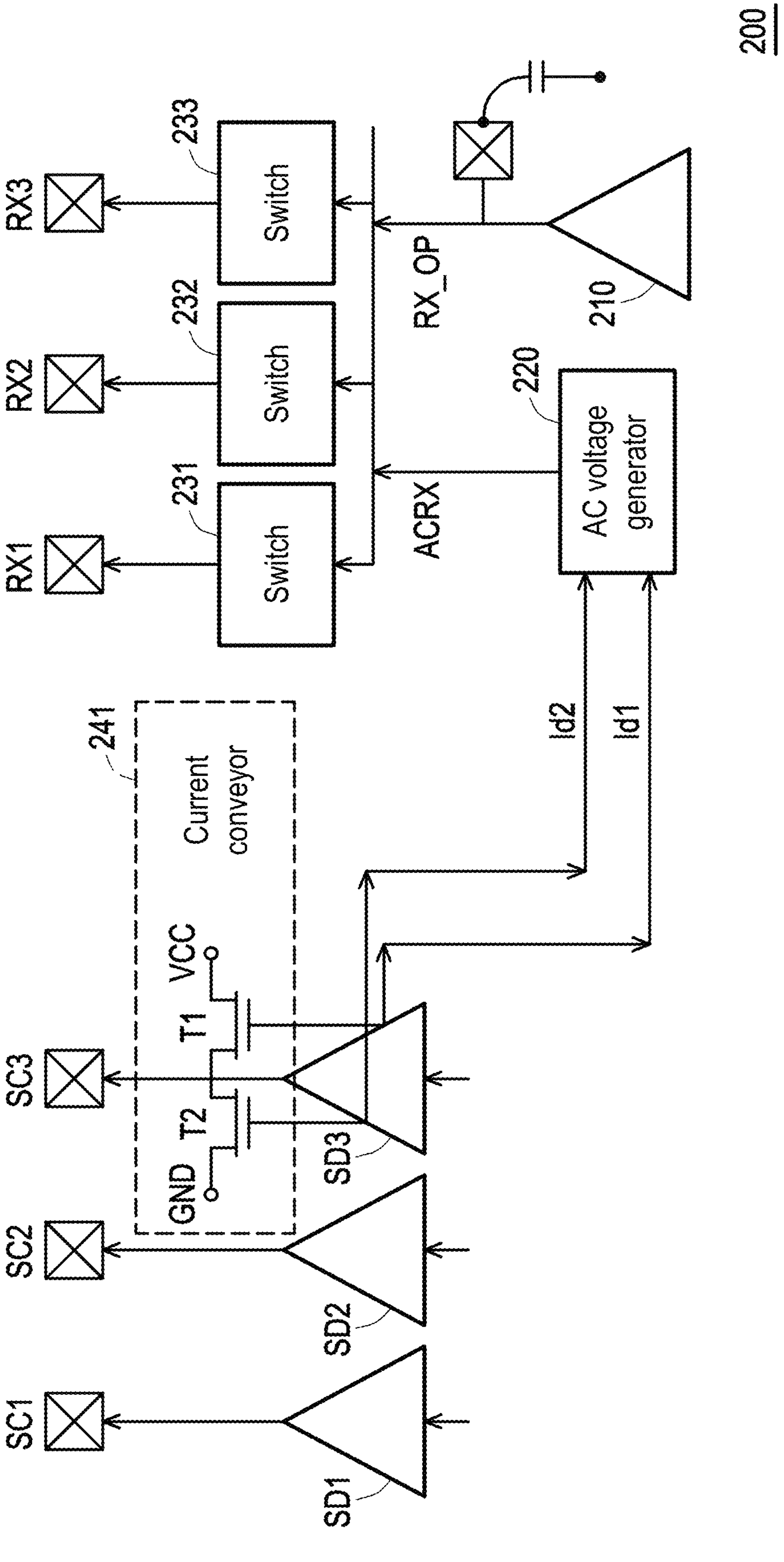
FIG. 2A illustrates a schematic diagram of a display device according to an embodiment of present disclosure.

Please refer to FIG. 2A, which illustrates a schematic diagram of a display device according to an embodiment of present disclosure. The display device 200 includes a common voltage generator 210 and an AC (alternative current) voltage generator 220. In this embodiment, the display device 200 further includes a display panel as the display panel 110 of FIG. 1A, and a plurality of source drivers SD1 to SD3. The common voltage generator 210 generates a common voltage RX_OP with a DC voltage level. An output end of the AC voltage generator 220 is coupled to an output end of the common voltage generator 210. The AC voltage generator 220 generates an adjusting voltage ACRX, and transmits the adjusting voltage ACRX to the common voltage RX_OP. The adjusting voltage ACRX can be combined with the common voltage RX_OP to generate the common voltages RX1 to RX3, and each of the common voltages RX1 to RX3 may be transmitted to each of the display area substrates 111 to 115 as shown in FIG. 1A through switches 231 to 233, respectively.

In this embodiment, the AC voltage generator 220 generates the adjusting voltage ACRX according to driving current information of the source drivers SD1 to SD3 of the display device 200. The driving current information includes source current information Id1 and sink current information Id2. In this embodiment, the source current information Id1 and sink current information Id2 can be obtained from the source drivers SD1 to SD3. The AC voltage generator 220 may obtain the source current information Id1 and sink current information Id2 from a current conveyor of each of the source drivers SD1 to SD3.

In detail, take the source driver SD3 as an example. The source driver SD3 includes a current conveyor 241. The current conveyor 241 may includes a transistor T1 and a transistor T2. The transistor T1 is configured to be a pull-up transistor, and is coupled between a power source end VCC and an output end of the source driver SD3. The transistor T2 is configured to be a pull-down transistor, and is coupled between a reference ground end GND and the output end of the source driver SD3. The AC voltage generator 220 is coupled to control ends of the transistors T1 and T2, and obtains the source current information Id1 and the sink current information Id1 according to driving signals of the transistors T1 and T2.

In fact, the AC voltage generator 220 is coupled to the current conveyors of the source drivers SD1 to SD3. The AC voltage generator 220 may obtain the source current information Id1 according to the driving signals of pull-up transistors of the current conveyors, and obtain the sink current information Id2 according to the driving signals of pull-down transistors of the current conveyors.

Figure 2B:
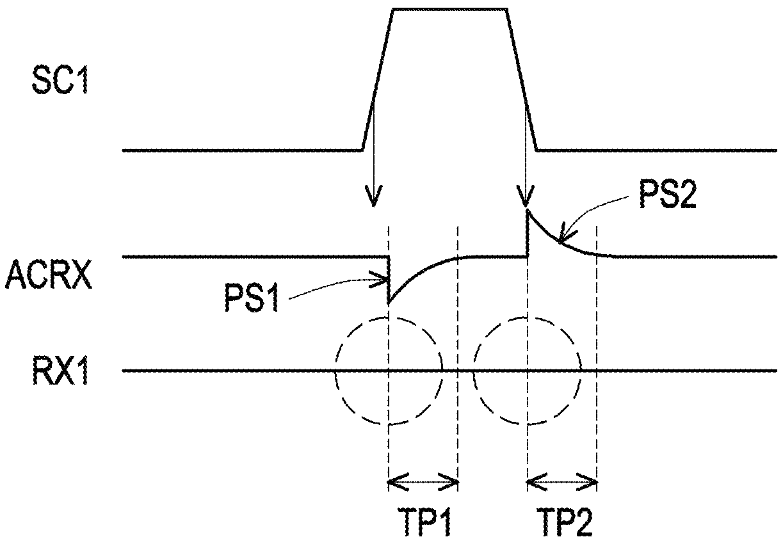
FIG. 2B illustrates a waveform plot of the display device according to the embodiment of FIG. 2A of present disclosure.

Please refer to FIG. 2A and FIG. 2B commonly, wherein FIG. 2B illustrates a waveform plot of the display device according to the embodiment of FIG. 2A of present disclosure. In FIG. 2A, take the source line signal SC1 as an example. When the source line signal SC1 is transited from a low voltage level to a high voltage level, the pull-up transistor of the current conveyor of the source driver SD1 may be turned on. The AC voltage generator 220 may receive the source current information Id1, and generates a negative pulse PS1 on the adjusting voltage ACRX during a time period TP1. On the contrary, when the source line signal SC1 is transited from the high voltage level to the low voltage level, the pull-down transistor of the current conveyor of the source driver SD1 may be turned on. The AC voltage generator 220 may receive the sink current information Id2, and generates a positive pulse PS2 on the adjusting voltage ACRX during a time period TP2.

It can be seen, the AC voltage generator 220 provides the adjusting voltage ACRX with the negative pulse PS1 and the positive pulse PS2 to be combined with the common voltage RX_OP generated by the common voltage generator 210 to generate the common voltage RX1 received by each of the display area substrate. Such as that, interference on the common voltage RX_OP can be compensated by the negative pulse PS1 and the positive pulse PS2 of the adjusting voltage ACRX. That is, radiations on the display panel can be reduced, EMI on the display device 200 can be reduced, too.

It should be noted here, in some embodiments, since the AC voltage generator 220 is coupled to a number of source drivers SD1 to SD3, the AC voltage generator 220 may decide to generate the positive pulse PS2 or the negative pulse PS1 on the adjusting voltage ACRX by comparing the sink current information Id2 and the source current information Id1. In detail, if the sink current information Id2 is larger than the source current information Id1, the AC voltage generator 220 may generate the positive pulse PS2 on the adjusting voltage ACRX. If the sink current information Id2 is smaller than the source current information Id1, the AC voltage generator 220 may generate the negative pulse PS1 on the adjusting voltage ACRX. Moreover, if the sink current information Id2 is equal to the source current information Id1, the AC voltage generator 220 may set the adjusting voltage ACRX held on a constant voltage level.

Figure 2C:
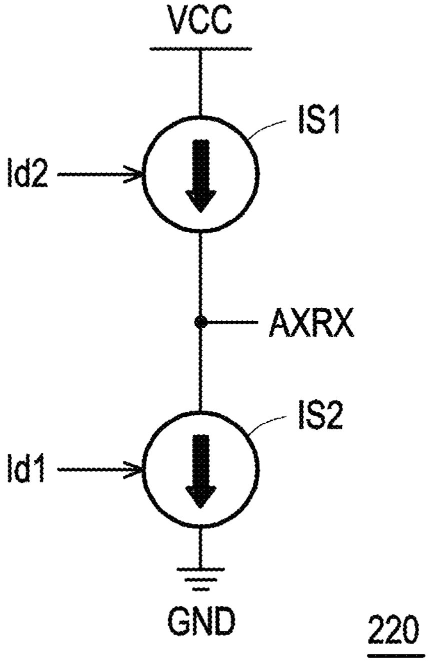
FIG. 2C illustrates a schematic diagram of the AC voltage generator 220 according to the embodiment of FIG. 2A of present disclosure.

Please refer to FIG. 2C, which illustrates a schematic diagram of the AC voltage generator 220 according to the embodiment of FIG. 2A of present disclosure. The AC voltage generator 220 may include current sources IS1 and IS2. The current source IS1 is coupled between the power source end VCC and the output end of the AC voltage generator 220. The current source IS2 is coupled between the output end of the AC voltage generator 220 and a reference ground end GND. The current source IS1 may be controlled by the sink current information Id2, and used to provide a source current to the output end of the AC voltage generator 220. The current source IS2 may be controlled by the source current information Id1, and used to draining a sink current from the output end of the AC voltage generator 220. The output end of the AC voltage generator 220 is used to generate the adjusting voltage ACRX.

In this embodiment, if the source current generated by the current source IS1 is larger than the sink current generated by the current source IS2, a voltage level of the adjusting voltage ACRX may be pulled up to generate a positive pulse on the adjusting voltage ACRX. If the source current generated by the current source IS1 is smaller than the sink current generated by the current source IS2, the voltage level of the adjusting voltage ACRX may be pulled down to generate a negative pulse on the adjusting voltage ACRX. Furthermore, if the source current generated by the current source IS1 is equal to the sink current generated by the current source IS2, the voltage level of the adjusting voltage ACRX keeps on a constant level.

Figure 3A:
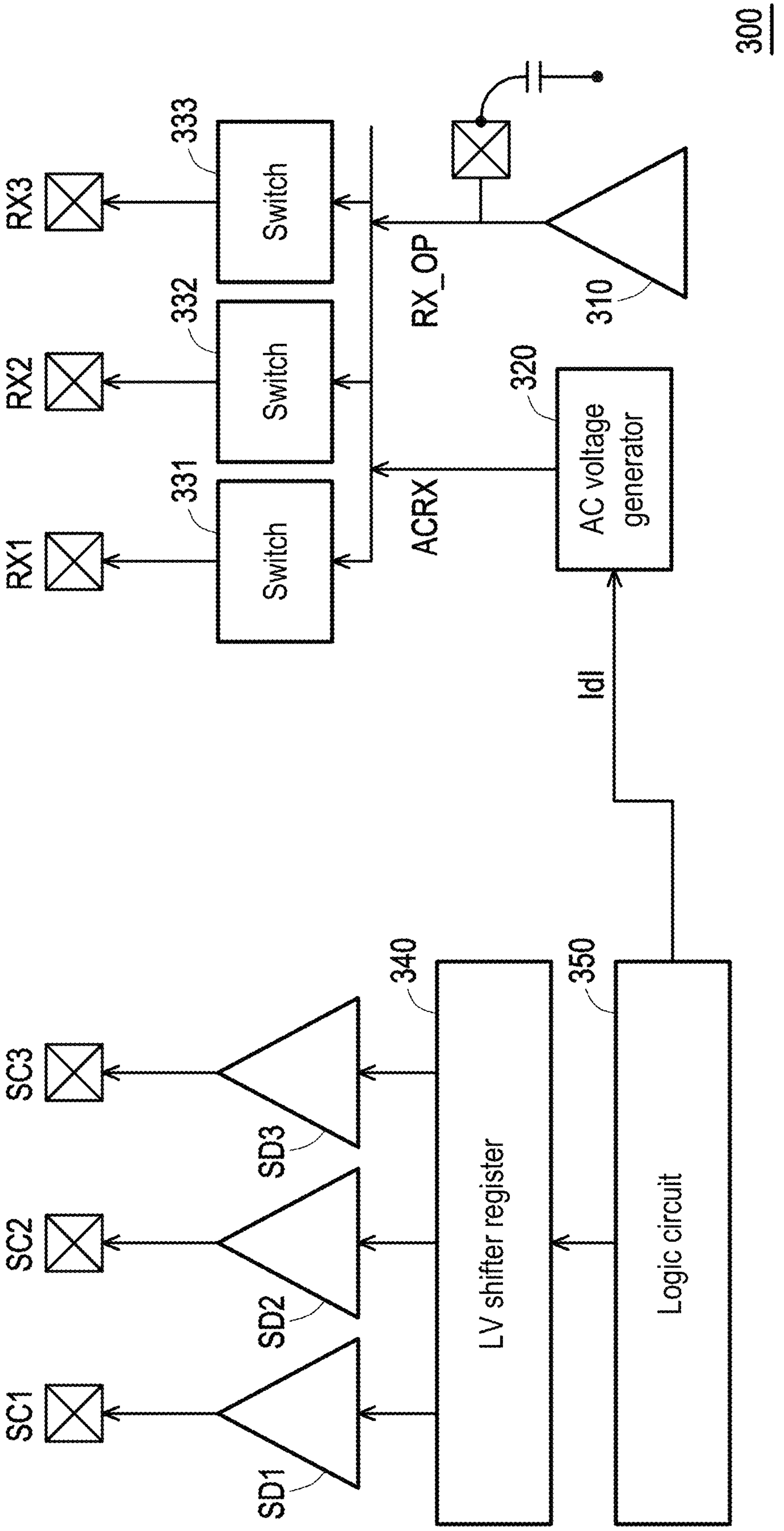
FIG. 3A illustrates a schematic diagram of a display device according to another embodiment of present disclosure.

Please refer to FIG. 3A, which illustrates a schematic diagram of a display device according to another embodiment of present disclosure. The display device 300 includes a common voltage generator 310, an AC voltage generator 320, source drivers SD1 to SD3, a LV (low voltage) shifter register 340, a logic circuit 350 and a plurality of switches 331 to 333. In this embodiment, the display device 300 may further include a display panel as the display panel 110 of FIG. 1A. The common voltage generator 310 generates a common voltage RX_OP with a DC voltage level. An output end of the AC voltage generator 320 is coupled to an output end of the common voltage generator 310. The AC voltage generator 320 generates an adjusting voltage ACRX, and transmits the adjusting voltage ACRX to the common voltage RX_OP. The adjusting voltage ACRX can be combined with the common voltage RX_OP to generate the common voltages RX1 to RX3, and each of the common voltages RX1 to RX3 may be transmitted to each of the display area substrates 111 to 115 as shown in FIG. 1A through switches 331 to 333, respectively.

On the other hand, input ends of the source drivers SD1 to SD3 are coupled to the LV shifter register 340. The LV shifter register 340 is used to store a plurality of display data corresponding to the source drivers SD1 to SD3, shifts each display data to each of the source drivers SD1 to SD3, and outputs each of the display data to corresponding source driver SD1 to SD3.

Different the display device 200 in FIG. 2A, the AC voltage generator 320 of present embodiment is coupled to the logic circuit 350. The logic circuit 350 is coupled to the LV shifter register 340. The logic circuit 350 receives a plurality of input data (the display data) of the source drivers SD1 to SD3. The logic circuit 350 sums the input data to obtain a summation data, and calculates a difference value of the summation data of different time periods to obtain the driving current information.

Figure 3B:
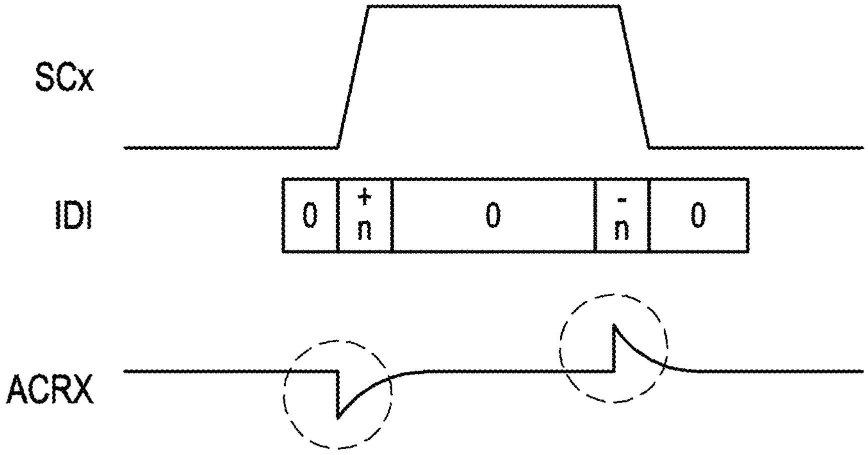
FIG. 3B illustrates a waveform plot of the display device 300 of the embodiment in FIG. 3A.

Please refer to FIG. 3A and FIG. 3B commonly, wherein FIG. 3B illustrates a waveform plot of the display device 300 of the embodiment in FIG. 3A. The logic circuit 350 may sums the input data of the source drivers SD1 to SD3 to obtain the summation data, and calculates a difference value of the summation data to obtain the driving current information IDI. Corresponding to a rising status of a source line signal SCx, the different value of the driving current information IDI may be +n. Moreover, corresponding to a failing status of the source line signal SCx, the different value of the driving current information IDI may be −n, where n is a positive number. In here, the source line signal SCx may be a combination signal of source line signals outputted by the source driver SD1 to SD3. In this embodiment, the different value of the driving current information IDI is a digital code.

In response to the driving current information IDI, the AC voltage generator 320 may generate the adjusting voltage ACRX according to the different value of the driving current information IDI. The AC voltage generator 320 may generate the adjusting voltage ACRX with a negative pulse corresponding to the driving current information IDI with the difference value +n, and generate the adjusting voltage ACRX with a positive pulse corresponding to the driving current information IDI with the difference value-n. If the difference value of the driving current information IDI is 0, the AC voltage generator 320 keep a voltage level of the adjusting voltage ACRX unchanged.

Figure 4:
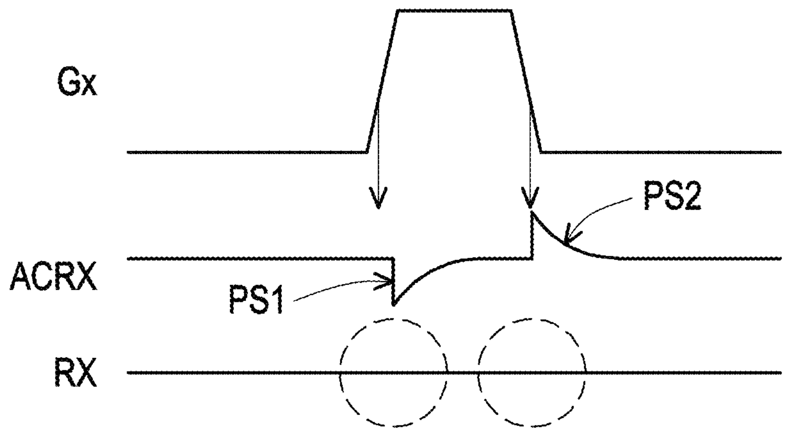
FIG. 4 illustrate a waveform plot of a display device according to another embodiment of present disclosure.

Please refer to FIG. 4, which illustrate a waveform plot of a display device according to another embodiment of present disclosure. In FIG. 4, an AC voltage generator of a display device may be coupled to gate line drivers of the display device. The AC voltage generator may generate an adjusting voltage ACRX according to a transition status of each of the gate line signal Gx of the display device. Corresponding to a rising edge of the gate line signal Gx, the AC voltage generator may generate the adjusting voltage ACRX with a negative pulse PS1, and corresponding to a failing edge of the gate line signal Gx, the AC voltage generator may generate the adjusting voltage ACRX with a positive pulse PS2. By applying the adjusting voltage ACRX on the common voltage generated by the common voltage generator of the display device, the common voltage RX received by each of the display area substrates may be compensated. The compensated common voltage RX may substantially keep on a constant voltage level, and radiations on the display device can be reduced.

About circuit structure of this embodiment can be refer to FIG. 2. The AC voltage generator 220 may be further coupled to the gate line drivers of the display device 200 in this embodiment. The AC voltage generator 220 may obtain the transition status of each of the gate line driver by receiving driving current information of the gate line drivers. The driving current information of the gate line drivers can be obtained by same scheme of the driving current information of source drivers in the embodiment of FIG. 2A and FIG. 3A, and no more repeated describe here.

Figure 5:
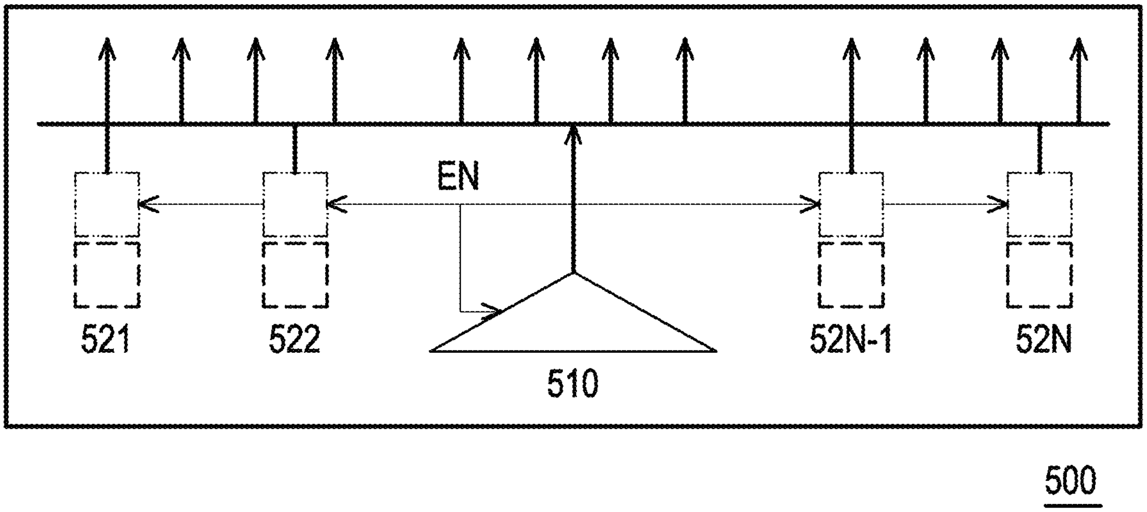
FIG. 5 illustrates a schematic diagram of a layout plot of a display device according to an embodiment of present disclosure.

Please refer to FIG. 5, which illustrates a schematic diagram of a layout plot of a display device according to an embodiment of present disclosure. In this embodiment, a plurality of AC voltage generators 521 to 52N may be disposed in the display device 500. Output ends of the AC voltage generators 521 to 52N are coupled to an output end of a common voltage generator 510. The common voltage generator 510 is controlled by an enable signal EN. The AC voltage generators 521 to 52N may be separated disposed in the display device 500. In this embodiment, each of the AC voltage generators 521 to 52N may be independently controlled. Furthermore, number of the AC voltage generators 521 to 52N may be decided by a designer according to actual application status of the display device 500, and no special limitation here. Besides, in some embodiments, a first part of the AC voltage generators 521 to 52N may generate the adjusting voltage according to the driving current information of source drivers, and a second part of the AC voltage generators 521 to 52N may be applied to generate the adjusting voltage according to the driving current information of gate drivers. In other embodiments, each the AC voltage generators 521 to 52N may generate the adjusting voltage according to the driving current information of the source drivers and the gate drivers.

Figure 6:
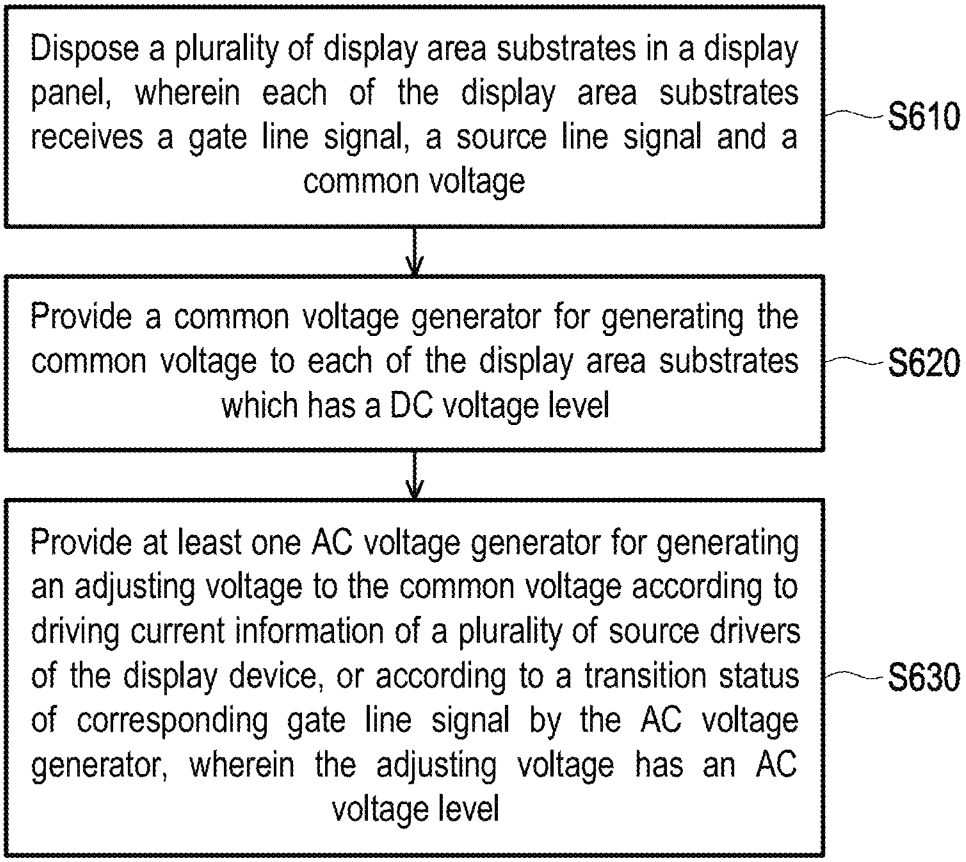
FIG. 6 illustrates a flow diagram of a control method of a display device according to an embodiment of present disclosure.

Please refer to FIG. 6, which illustrates a flow diagram of a control method of a display device according to an embodiment of present disclosure. In a step S610, a plurality of display area substrates are disposed in a display panel, wherein each of the display area substrates receives a gate line signal, a source line signal and a common voltage. In a step S620, a common voltage generator is provided for generating the common voltage to each of the display area substrates. In a step S630, at least one AC voltage generator is provided for generating an adjusting voltage to the common voltage according to driving current information of a plurality of source drivers of the display device or according to a transition status of corresponding gate line signal by the AC voltage generator, wherein the adjusting voltage has an AC voltage level.

Detail operations of the steps S610 to S630 have been described in the embodiments mentioned above, and no more repeated describe here.

In summary, the display device of present disclosure provides an AC voltage generator to generate an adjusting voltage according to driving current information of source drivers and/or gate drivers. By applying the adjusting voltage to a common voltage, peak voltages on the common voltage can be compensated, and radiation on the display device can be reduce correspondingly. Such as that, EMI endurance of the display device can be enhanced.

What is claimed is:

1. A display device, comprising:

a plurality of display area substrates, disposed in a display panel, wherein each of the display area substrates receives a gate line signal, a source line signal and a common voltage;

a common voltage generator, coupled to the display area substrates for generating the common voltage to each of the display area substrates; and at least one AC voltage generator, coupled to the common voltage generator, for generating an adjusting voltage to the common voltage according to driving current information of a plurality of source drivers of the display device, wherein the adjusting voltage has an AC voltage level, wherein the AC voltage generator generates a positive pulse on the adjusting voltage when sink current information of the driving current information is larger than source current information of the driving current information, and generates a negative pulse on the adjusting voltage when the sink current information is smaller than the source current information, wherein the AC voltage generator comprises:

a first current source, coupled between a power source end and an output end of the AC voltage generator, and providing a source current to the output end of the AC voltage generator according to the sink current information; and a second current source, coupled between a reference ground end and the output end of the AC voltage generator, and draining a sink current from the output end of the AC voltage generator according to the source current information.

2. The display device according to claim 1, wherein the AC voltage generator is further coupled to a plurality of current conveyers of the source drivers, and obtains the source current information and the sink current information according to driving signals of the current conveyers.

3. The display device according to claim 2, wherein each of the current conveyers comprises:

a first transistor, coupled between a power source end and an output end of each of the current conveyers, and controlled by a first driving signal; and a second transistor, coupled between a reference ground end and the output end of each of the current conveyers, and controlled by a second driving signal, wherein the AC voltage generator obtains the source current information according the first driving signals of all of the source drivers, and obtains the sink current information according the second driving signals of all of the source drivers.

4. The display device according to claim 1, further comprises:

a logic circuit, coupled to the source drivers, wherein the logic circuit receives a plurality of input data of the source drivers, summing the input data to obtain a summation data, and calculates a difference value of the summation data of different time periods to obtain the driving current information.

5. The display device according to claim 4, wherein the logic circuit subtracts a first summation data in a first time period by a second summation data in a second time period to calculates the difference value, wherein the first time period is earlier than the second time period.

6. The display device according to claim 5, wherein if the difference value is a negative value, the AC voltage generator generates a negative pulse on the adjusting voltage according to the driving current information, and if the difference value is a positive value, the AC voltage generator generates a positive pulse on the adjusting voltage according to the driving current information.

7. The display device according to claim 1, wherein the AC voltage generator further generates the adjusting voltage according to a transition status of corresponding gate line signal.

8. The display device according to claim 7, wherein if the corresponding gate line signal is transited from a first voltage to a second voltage, the AC voltage generator generates a negative pulse on the adjusting voltage, wherein the first voltage is smaller than the second voltage.

9. The display device according to claim 8, wherein if the corresponding gate line signal is transited from the first voltage to the second voltage, the AC voltage generator generates a positive pulse on the adjusting voltage.

10. A display device, comprising:

a plurality of display area substrates, disposed in a display panel, wherein each of the display area substrates receives a gate line signal, a source line signal and a common voltage;

a common voltage generator, coupled to the display area substrates for generating the common voltage to each of the display area substrates; and at least one AC voltage generator, coupled to the common voltage generator, for generating an adjusting voltage to the common voltage according to a transition status of corresponding gate line signal, wherein the adjusting voltage has an AC voltage level, wherein the AC voltage generator generates a positive pulse on the adjusting voltage when sink current information of the driving current information is larger than source current information of the driving current information, and generates a negative pulse on the adjusting voltage when the sink current information is smaller than the source current information, wherein the AC voltage generator comprises:

a first current source, coupled between a power source end and an output end of the AC voltage generator, and providing a source current to the output end of the AC voltage generator according to the sink current information; and a second current source, coupled between a reference ground end and the output end of the AC voltage generator, and draining a sink current from the output end of the AC voltage generator according to the source current information.

11. A control method of a display device, comprising:

disposing a plurality of display area substrates in a display panel, wherein each of the display area substrates receives a gate line signal, a source line signal and a common voltage;

providing a common voltage generator for generating the common voltage to each of the display area substrates;

providing at least one AC voltage generator for generating an adjusting voltage to the common voltage according to driving current information of a plurality of source drivers of the display device or according to a transition status of corresponding gate line signal by the AC voltage generator, wherein the adjusting voltage has an AC voltage level;

receiving a plurality of input data of the source drivers by a logic circuit;

summing the input data to obtain a summation data, and calculating a difference value of the summation data of different time periods to obtain the driving current information by the logic circuit;

subtracting a first summation data in a first time period by a second summation data in a second time period to calculates the difference value, wherein the first time period is earlier than the second time period;

generating a negative pulse on the adjusting voltage according to the driving current information by the AC voltage generator if the difference value is a negative value; and generating a positive pulse on the adjusting voltage according to the driving current information by the AC voltage generator if the difference value is a positive value.

12. The control method according to claim 11, further comprising:

coupling the AC voltage generator to a plurality of current conveyers of the source drivers; and obtaining source current information and sink current information according to driving signals of the current conveyers.

13. The control method according to claim 11, further comprising:

generating a negative pulse on the adjusting voltage by the AC voltage generator if the corresponding gate line signal is transited from a first voltage to a second voltage, wherein the first voltage is smaller than the second voltage.

14. The control method according to claim 13, further comprising:

generating a positive pulse on the adjusting voltage by the AC voltage generator if the corresponding gate line signal is transited from the second voltage to the first voltage.

* * * * *